United States Patent
Kuipers

(10) Patent No.: US 6,450,572 B1
(45) Date of Patent: Sep. 17, 2002

(54) TOTAL COMFORT BICYCLE SADDLE

(76) Inventor: Raymond J. Kuipers, 27312 Via Segundo, Mission Viejo, CA (US) 92692

(*) Notice: Subject to any disclaimer, the term of this patent is extended or adjusted under 35 U.S.C. 154(b) by 0 days.

(21) Appl. No.: 09/848,190

(22) Filed: May 4, 2001

(51) Int. Cl.$^7$ ................................................ A47C 7/02
(52) U.S. Cl. ................ 297/195.1; 297/202; 297/452.27
(58) Field of Search ............................. 297/195.1, 199, 297/200, 201, 202, 204, 452.41, 452.42, 452.46, 452.22, 452.26, 452.27; 5/740, 727, 730

(56) References Cited

U.S. PATENT DOCUMENTS

| | | | | |
|---|---|---|---|---|
| 613,050 A | * | 10/1898 | Wheeler | 297/207 |
| 630,911 A | * | 8/1899 | Moore | 297/202 |
| 2,412,112 A | * | 12/1946 | Wood et al. | 297/452.26 |
| 4,755,411 A | * | 7/1988 | Wing et al. | 297/452.27 X |
| 5,165,752 A | | 11/1992 | Terry | |
| 5,356,205 A | * | 10/1994 | Calvert et al. | 297/452.46 X |
| 5,670,232 A | * | 9/1997 | Bigolin | 297/200 X |
| 5,904,396 A | * | 5/1999 | Yates | 297/452.41 X |
| 6,106,059 A | | 8/2000 | Minkow et al. | 297/202 |
| 6,244,655 B1 | | 6/2001 | Minkow et al. | 297/202 |
| 6,257,662 B1 | * | 7/2001 | Yates | 297/202 X |
| 6,322,139 B1 | * | 11/2001 | Chuang | 297/195.1 |

* cited by examiner

Primary Examiner—Peter M. Cuomo
Assistant Examiner—Stephen Vu
(74) Attorney, Agent, or Firm—Morland C. Fischer

(57) ABSTRACT

A total comfort bicycle saddle that is adapted to provide a rider with both a comfortable cushion surface as well as a firm support surface to enhance the rider's comfort and provide adequate support of the rider's weight. The bicycle saddle includes a relatively hard foam extending over a rigid base, a relatively soft foam extending over the relatively hard foam, and a region of gel located on top of the relatively soft foam. The relatively soft foam is adapted to provide a comfortable cushion surface for the seated rider. The relatively hard foam lying below the relatively soft foam is adapted to prevent the rider from sinking into the soft foam and engaging the rigid base. The gel on top of the relatively soft foam is adapted to undergo a change in shape in response to a seated rider shifting his position so as to evenly distribute the rider's weight over the top of the saddle.

6 Claims, 3 Drawing Sheets

TOTAL COMFORT BICYCLE SADDLE

BACKGROUND OF THE INVENTION

1. Field of the Invention

This invention relates to a total comfort bicycle saddle that is adapted to provide a rider with both a comfortable cushion surface at a relatively soft foam area of the saddle as well as a firm support surface at a relatively hard foam area that lies below the soft foam area.

2. Background Art

Bicycle saddles have long been connected to the frame of a bicycle to support the weight of a rider. However, a problem that is common to many commercially available bicycle saddles is that they are either too soft or too hard. More particularly, in cases where the saddle consists only of a hard seat material, the rider gains the advantage of adequate support at the expense of comfort, especially when he will be seated for long periods of time. Such a hard support surface may undesirably restrict the blood flow through the blood vessels within the soft tissues of the rider. In cases where the saddle consists of only a soft cushion material, the rider will experience a more comfortable seat, but he may find himself without the sufficient firmness that is necessary to adequately support his weight. Consequently, the rider may sink into the saddle so as to come to rest against the rigid base plate or frame over which the saddle material is laid.

Accordingly, what is needed is a bicycle saddle that is capable of providing the rider with a soft and comfortable cushion surface on one hand as well as a firm surface on the other hand by which to support the rider's weight above the rigid base plate, especially when the rider will be seated for a long period of time.

Reference may be made to U.S. Pat. No. 5,165,752 issued Nov. 24, 1992 for an example of a bicycle saddle having different cushion sections aligned side-by-side one another.

SUMMARY OF THE INVENTION

A total comfort bicycle saddle is disclosed having a relatively hard (e.g., closed cell polyurethane) foam material covering a rigid base plate at the bottom of the saddle to provide a firm foundation to support the weight of the rider. The bicycle saddle also includes a relatively soft (e.g., cell) foam material that lies above the hard foam material and provides the rider with a comfortable cushion surface. The hard foam material is preferably 40% to 60% denser than the soft foam material. The soft foam material covers the hard foam material and runs completely across the saddle from the nose to the rear thereof. The hard foam material at the bottom of the saddle over which the soft foam material extends prevents the rider from sinking too deeply into the soft foam material and thereby experiencing possible discomfort by coming to rest too close to the rigid base plate.

An optional air hole may be formed through the bicycle saddle to provide a source of ventilation and reduce the pressure applied to the perineal nerves of the rider. The air hole is located within a longitudinally extending channel that bisects the saddle along the top thereof. Pockets of (e.g., polyurethane) gel are located above the soft foam material near the rear of the saddle at opposite sides of the longitudinally extending channel. The pockets of gel respond to the shifting position of the rider so as to more evenly spread the rider's weight over the top of the saddle.

DETAILED DESCRIPTION

Figure 1:
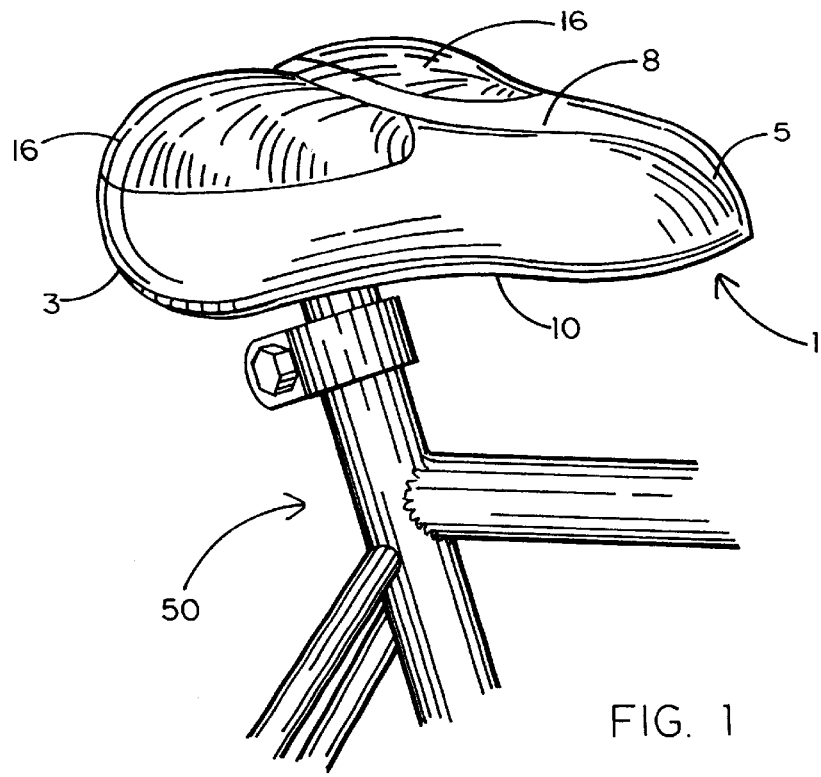
FIG. 1 shows the total comfort bicycle saddle which forms the present invention attached to the frame of a bicycle with the saddle cover removed.
Figure 2:
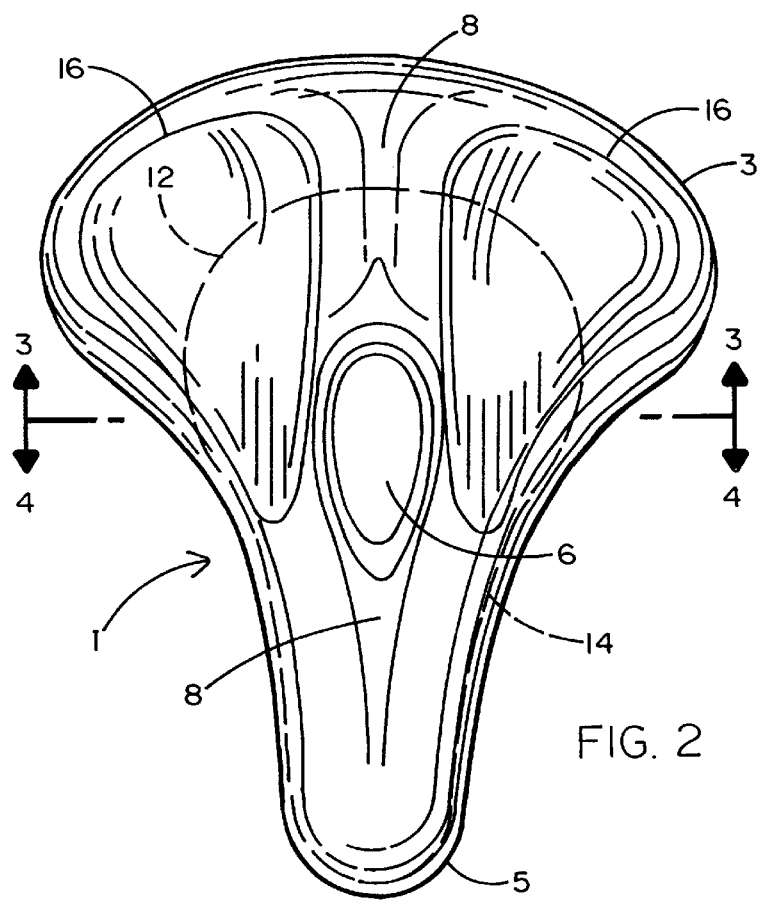
FIG. 2 is a top view of the bicycle saddle of FIG. 1.

The bicycle saddle 1 which forms the present invention and provides maximum comfort while firmly supporting the. weight of a rider is now described in detail while referring concurrently to FIGS. 1–5 of the drawings. As with conventional bicycle saddles, the saddle 1 of this invention has a relatively wide rear 3 at one end that tapers towards a relatively narrow nose 5 at the opposite end. The top of the saddle 1 is surrounded by the usual protective cover (not shown) which is typically a wear resistant material, such as vinyl, or the like. Moreover, the bottom of the saddle 1 is provided with mounting rails (also riot known) which are secured to the base plate (designated 10 in FIGS. 3 and 4) in order to provide a means for mounting, the saddle to a bicycle frame (designated 50 and best shown in FIG. 1).

A (e.g., tear drop shaped) hole 6 is formed completely through the saddle 1 at approximately the mid-point thereof. The hole 6 is located within a channel 8 that runs longitudinally along the top of the saddle between the rear and nose ends 3 and 5 so as to bisect the saddle. The hole 6 creates a vertical opening through the saddle by which to reduce the pressure that would otherwise be applied during long trips to the perineal nerve bundle of a rider. Such pressure has been known to constrict the nerves and undesirably reduce blood flow in the blood vessels of the soft tissues which may result in rider discomfort. What is more, the hole 6 through saddle 1 establishes an opening through which air can flow in order to improve ventilation to the rider, especially a woman. The longitudinal channel 8 in which the hole 6 is formed helps to distribute the air flow to the interface between the rider and the saddle. However, it should be understood that while the hole 6 and channel 8 are advantageous for maximizing the comfort of the rider, they are not required to achieve the specific additional benefits that are offered by the improvements of this invention to be disclosed below.

Figure 3:
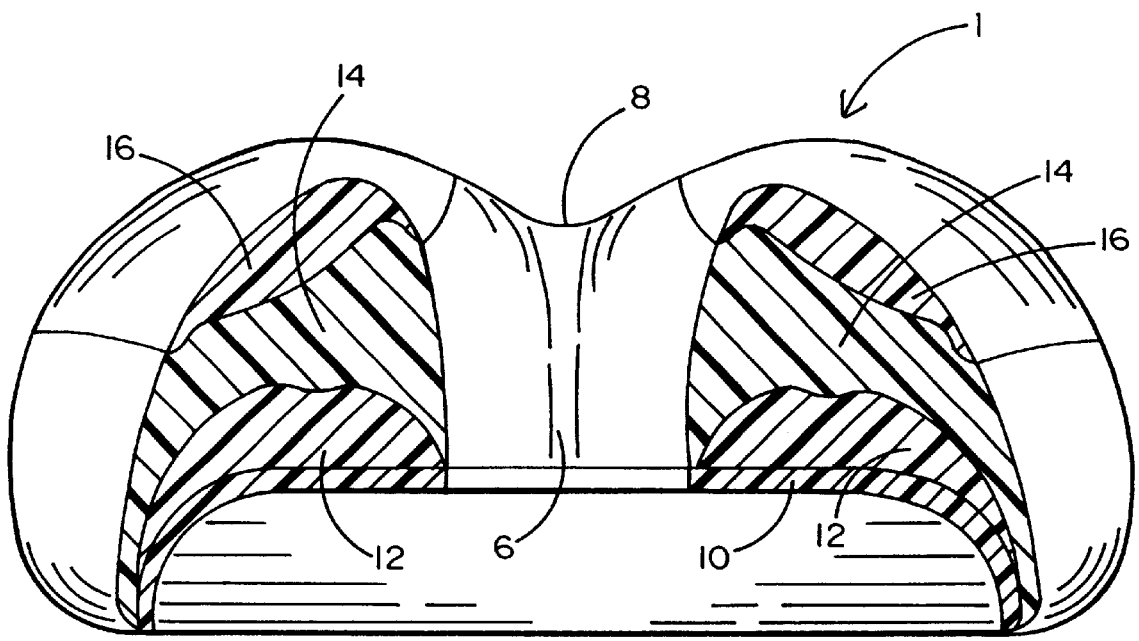
FIG. 3 is a cross-section of the bicycle saddle taken along lines 3—3 of FIG: 2.
Figure 4:
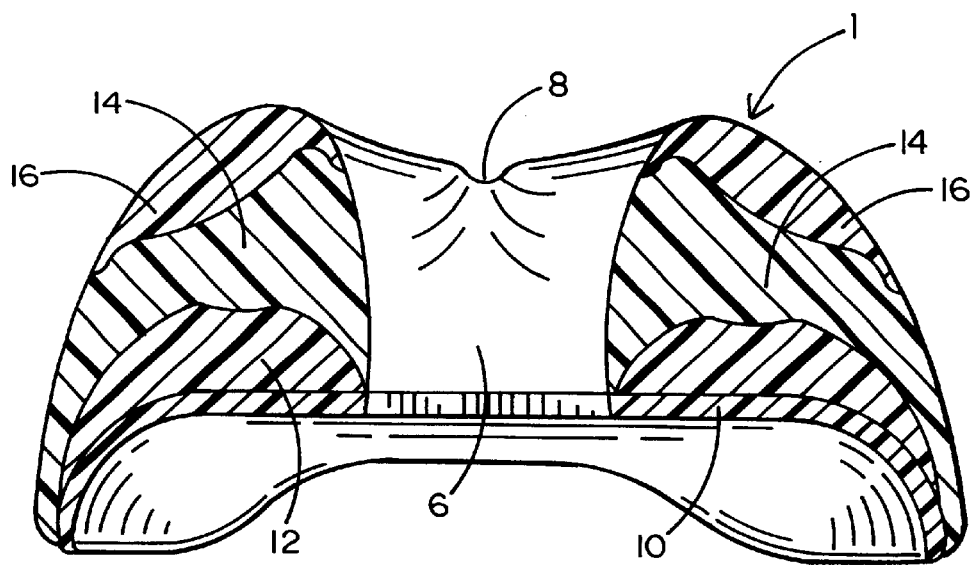
FIG. 4 is a cross-section of the bicycle saddle taken along lines 4—4 of FIG. 2.
Figure 5:
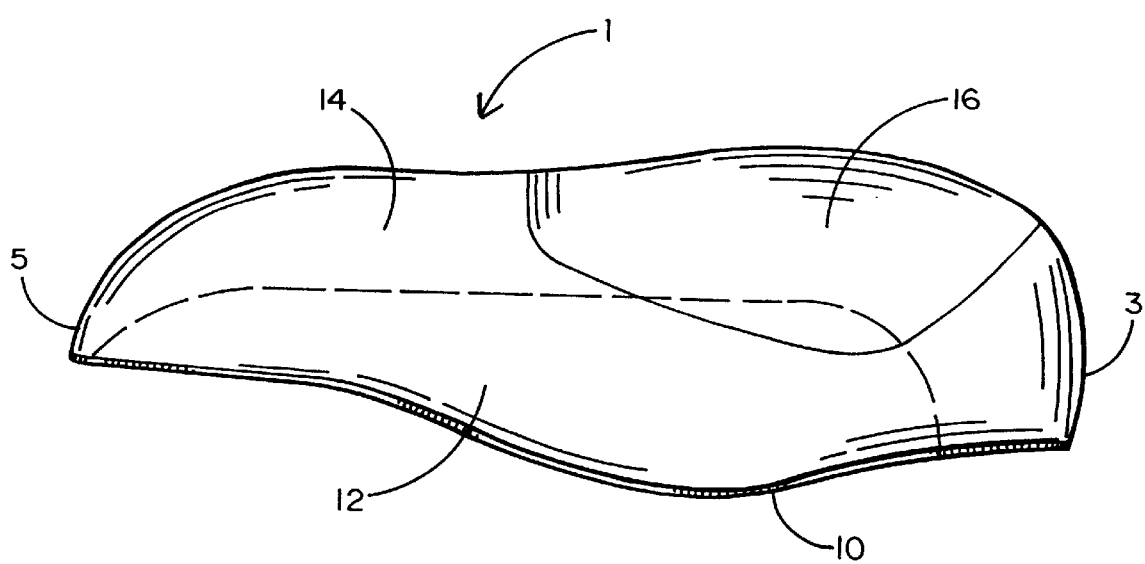
FIG. 5 is a side view of the bicycle saddle of FIG. 1.

In accordance with the present improvements, the bicycle saddle 1 is manufactured with separate regions of resilient material that are disposed one above the other and characterized by different durometers. Referring particularly to FIGS. 3–5 of the drawings, the saddle 1 is shown having a rigid base plate 10 that is made from a hard plastic material and extends along the bottom between the rear and nose ends 3 and 5. The aforementioned vertically extending hole 6 is formed through the base plate 10 to relieve pressure and enhance air flow to the rider, as previously described.

Located on top of the base plate 10 and surrounding the hole 6 is a region of relatively hard and firm resilient material 12. The relatively hard foam material 12 is preferably a closed cell polyurethane foam. As is best shown in FIG. 5, the hard foam material 12 covers substantially all of base plate 10. Next, a relatively soft resilient material 14 is placed on top of the hard foam material 12 so as to surround the hole 6. The soft resilient material 14 is also preferably a closed cell polyurethane foam. To best accommodate the weight of a variety of different riders, the relatively hard foam material 12 is preferably 40% to 60% denser than the relatively soft foam material 14. As is also best shown in FIG. 5, the hard foam material runs continuously between the rear and nose ends 3 and 5 of bicycle saddle 1 and completely covers the soft foam material 14 lying thereunder. The hard foam material 12 located below the soft foam material 14 serves as a firm foundation to support the rider's weight and thereby prevent the rider from sinking into the soft foam material 14 and coming to rest too close to the rigid base plate 10 on which the hard and soft foam materials 12 and 14 are located.

Lastly, a gel material 16 is located on top of the soft foam material 14 towards the rear 3 of bicycle saddle 1 so as to be positioned in pockets that are spaced apart from one another at opposite sides of the longitudinally extending channel 8. The gel material 16 is located at the top of the saddle 1 so as to receive a majority of the weight of the rider. The gel material 16 is preferably a polyurethane gel that is adapted to move in response to the shifting weight of the rider. That is to say, the gel material 16 is capable of sliding back and forth as the rider correspondingly chances his position while seated upon the saddle 1. Thus, the rider's weight will be more evenly distributed along the top of the saddle so as to maximize the rider's comfort during long trips.

The bicycle saddle 1 disclosed above may be manufactured by means of a conventional injection molding process. After a suitably shaped mold is constructed, the relatively hard foam material 12 fills the bottom of the mold cavity. The gel 16 is then loaded into the top of the mold cavity. Lastly, the intermediate soft foam material 14 is injected into the mold cavity so as to be disposed between the gel 16 at the top of the cavity and the soft foam material 12 at the bottom of the cavity. Appropriate heat and pressure are applied to manufacture an integral bicycle saddle core to be surrounded by a suitable cover (not shown) and attached to the bicycle frame 50 by the use of conventional hardware.

By virtue of the present invention, a total comfort bicycle saddle will be available to provide a rider with a comfortable cushion surface by means of a relatively soft intermediate foam material 14 and, at the same time, a firm foundation to adequately support the rider's weight by means of the relatively hard bottom foam in material 12 which lays upon the base plate 10. The rider will first typically feel the comfort provided by the intermediate soft cushion foam material 14 before he experiences the firm support provided by the hard cushion foam material 12 along the bottom of the saddle 1. So that the rider can travel for a long period of time under maximum comfort, the shape of the gel material 16 at the top of saddle 1 above the soft foam material 14 responds to the position of the rider so as to advantageously spread the rider's weight along the entire saddle. An optional air hole 16 is also provided through the saddle to improve ventilation and avoid a reduction in blood flow as a consequence of constructing the blood vessels in the soft tissues of the rider.

I claim:

1. A total comfort bicycle saddle having a nose and a rear, comprising a base for attachment to a frame of a bicycle, a relatively hard foam lying on top of the base, a relatively soft foam extending from the nose to the rear of said bicycle saddle and completely covering said relatively hard foam, a gel region located on top of said relatively soft foam such that said relatively hard foam, said relatively soft foam, and said gel region are disposed one above the other with said relatively soft foam providing a cushion surface to enhance the comfort of the rider, a channel running longitudinally along the top of said relatively soft foam and extending between the nose and rear of said bicycle saddle so as to bisect said gel region, and a pressure relieving hole located within said longitudinally running channel and extending vertically through said base and each of said relatively hard and soft foams located above said base, said pressure relieving hole providing ventilation to the rider along said longitudinally running hole, the relatively hard foam being substantially denser than said relatively soft foam for supporting the weight of the rider and preventing the rider from sinking into the soft foam and engaging the base, and said gel region undergoing a change of shape in response to the weight of the rider so as to distribute the rider's weight over said bicycle saddle.

2. The bicycle saddle recited in claim 1, wherein said relatively hard foam is 40% to 60% more dense than said relatively soft foam.

3. The bicycle saddle recited in claim 1, wherein said relatively hard foam lying on top of said base is a closed cell foam.

4. The bicycle saddle recited in claim 1, wherein said relatively soft foam covering said relatively hard foam is a closed cell foam.

5. The bicycle saddle recited in claim 1, wherein said gel region is located adjacent to the rear of said bicycle saddle.

6. The bicycle saddle recited in claim 1, wherein said gel region is polyurethane gel.

* * * * *